US008123089B2

(12) United States Patent
Biggs et al.

(10) Patent No.: US 8,123,089 B2
(45) Date of Patent: *Feb. 28, 2012

(54) DISPENSING ASSEMBLY WITH AN INJECTOR CONTROLLED GAS ENVIRONMENT

(75) Inventors: Glen Nelson Biggs, Wappingers Falls, NY (US); Russell A. Budd, North Salem, NY (US); Benjamin Vito Fasano, New Windsor, NY (US); John Joseph Garant, Poughkeepsie, NY (US); G. Gerard Gormley, Worcester, VT (US); John Peter Karidis, Ossining, NY (US); Christopher Lee Tessler, Poughquag, NY (US); Thomas Weiss, Poughkeepsie, NY (US)

(73) Assignee: Internation Business Machines Corporation, Armonk, NY (US)

( * ) Notice: Subject to any disclaimer, the term of this patent is extended or adjusted under 35 U.S.C. 154(b) by 547 days.

This patent is subject to a terminal disclaimer.

(21) Appl. No.: 12/244,145

(22) Filed: Oct. 2, 2008

(65) Prior Publication Data

US 2010/0084438 A1  Apr. 8, 2010

(51) Int. Cl.
 *B22D 37/00* (2006.01)

(52) U.S. Cl. .......... 222/590; 266/236; 222/603

(58) Field of Classification Search ........... 222/590, 222/593, 594, 603; 266/236
See application file for complete search history.

(56) References Cited

U.S. PATENT DOCUMENTS

| 5,320,273 | A | * | 6/1994 | Goenka et al. ........... 222/603 |
| 6,056,191 | A | | 5/2000 | Brouillette et al. |
| 6,231,333 | B1 | | 5/2001 | Gruber et al. |
| 6,527,158 | B1 | | 3/2003 | Brouillette et al. |
| 7,757,932 | B2 | * | 7/2010 | Schultz ................... 228/256 |
| 2007/0246518 | A1 | | 10/2007 | Cordes et al. |

FOREIGN PATENT DOCUMENTS

JP  2008093690 A  4/2008
KR  100795772 B1  1/2008

* cited by examiner

*Primary Examiner* — Scott Kastler
(74) *Attorney, Agent, or Firm* — Daniel P. Morris; Ryan, Mason & Lewis, LLP

(57) ABSTRACT

An apparatus for dispensing fusible material onto a surface, wherein the fusible material is in molten form, is provided. The apparatus comprises a dispensing assembly comprising a seal structure. The seal structure controls dispensing of the fusible material. One or more gas injectors are coupled to the dispensing assembly. Each of the one or more gas injectors is adapted to inject at least one gas to the dispensing assembly for controlling a gas environment surrounding at least a portion of the seal structure. An oxidation rate of the fusible material is controlled as a function of at least one characteristic of the at least one gas.

24 Claims, 2 Drawing Sheets

DISPENSING ASSEMBLY WITH AN INJECTOR CONTROLLED GAS ENVIRONMENT

CROSS-REFERENCE TO RELATED APPLICATION

This application is related to the concurrently filed U.S. patent application identified by Ser. No. 12/244,118, and entitled "Dispensing Assembly With a Controlled Gas Environment," the disclosure of which is incorporated by reference herein.

FIELD OF THE INVENTION

The present invention relates generally to integrated circuit connection, and more particularly, to depositing fusible material onto a surface.

BACKGROUND OF THE INVENTION

Using conventional techniques, a silicon chip may be connected to a chip carrier via a flip chip process which utilizes small solder balls, also known as controlled collapse chip connections (C4s). The chip may then be attached to its carrier by a standard solder joining process, or an alternative attachment means. The chip carrier then directs the chip signals and power connections of the silicon chip to bottom side carrier pads. Several technologies have been used to attach the C4 solder balls to a chip, for example, by evaporation or by electroplating metal onto the pads of the chip. Recently, a process known as controlled collapse chip connection new process (C4NP) has been proposed. C4NP directly deposits solder onto a pad by contact transfer. The deposited solder forms C4 solder balls via a thermal reflow process.

C4NP technology has the potential to revolutionize the wafer bumping industry by enabling the bumping of many leaded and lead-free solders in a speedy and cost effective manner. For example, the C4NP process facilitates mass production of solder deposits. This is accomplished by filling cavities in a glass mold plate with molten solder. Naturally, as the molten solder is dispensed, it oxidizes rapidly as it is exposed to air. Solder, which usually consists of tin, becomes extremely hard and abrasive when it is oxidized. In many instances, the oxidized solder builds up on a fill head seal of the solder dispenser. This buildup degrades the life of the fill head seal and further results in unwanted solder residue on the glass mold plate.

SUMMARY OF THE INVENTION

Illustrative embodiments of the present invention beneficially address the above-noted problems regarding the oxidation of fusible material and the buildup of oxidized material on the seal of a dispensing assembly by providing techniques for controlling a gas environment of the dispensing assembly via one or more gas injectors.

For example, in accordance with one embodiment of the invention, an apparatus for dispensing molten fusible material onto a surface is provided. The apparatus comprises a dispensing assembly comprising a seal structure. The seal structure controls dispensing of the fusible material. The apparatus further comprises one or more gas injectors coupled to the dispensing assembly. Each of the one or more gas injectors is adapted to inject at least one gas to the dispensing assembly for controlling a gas environment surrounding at least a portion of the seal structure. An oxidation rate of the fusible material is controlled as a function of at least one characteristic of the at least one gas.

At least one of the one or more gas injectors may comprise a gas manifold. The gas manifold may be fabricated from a metal, a high temperature polymer, and/or a ceramic material. At least one of the one or more gas injectors may comprise at least one gas distribution opening for providing even gas distribution. Further, at least one of the one or more gas injectors may comprise a gas reservoir adapted to hold the at least one gas. At least one of the one or more gas injectors may be operative to inject the at least one gas at a constant pressure.

Also, the one or more gas injectors may be positioned at a leading edge of the dispensing assembly and/or positioned at a trailing edge of the dispensing assembly. Each of the one or more gas injectors may be adapted to inject a different gas.

In accordance with a second embodiment of the present invention, a method for dispensing molten fusible material onto a surface is provided. At least one gas is injected to a dispensing assembly to control a gas environment surrounding at least a portion of a seal structure of the dispensing assembly. The dispensing assembly dispenses the fusible material. Further, an oxidation rate of the fusible material is controlled as a function of at least one characteristic of the at least one gas.

In accordance with a third embodiment of the present invention, an apparatus for dispensing molten fusible material onto a surface is presented. The apparatus comprises: a dispensing assembly with a leading edge and a trailing edge, comprising: (i) a reservoir for containing the fusible material; (ii) a pressure system coupled to the reservoir for pressurizing the reservoir; (iii) a heating unit surrounding the reservoir for heating the fusible material; and (iv) a seal structure coupled to the reservoir for controlling a dispensing of the fusible material; a first gas injector comprising a gas reservoir and at least one gas distribution opening, wherein the first gas injector is operative to inject a first at least one gas to the dispensing assembly and is positioned at the leading edge of the dispensing assembly; and a second gas injector comprising a gas reservoir and at least one gas distribution opening, wherein the second gas injector is operative to inject a second at least one gas to the dispensing assembly and is positioned at the trailing edge of the dispensing assembly. At least one insulator is positioned between the dispensing assembly and at least one of the first and second gas injectors.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described in conjunction with exemplary methods and apparatus for dispensing molten solder onto a surface, such as a glass mold plate. Such methods and apparatus may be used to form solder balls in a flip chip connection process. It should be understood, however, that the invention is not limited to the particular arrangements and materials as described herein. For example, the techniques described herein may be applicable to the dispensing of any molten material that may be susceptible to oxidation or may require a controlled gas environment. Further, it should be appreciated that the exemplary dispensing apparatus shown in the accompanying figures may not be drawn to scale, and that modifications to the illustrative embodiments will become apparent to those skilled in the art given the teachings described herein.

The term "dispensing assembly" as used herein is intended to be construed broadly so as to encompass, by way of example and without limitation, any mechanism or apparatus used to dispense any substance.

The term "seal structure" as used herein is intended to be construed broadly so as to encompass, by way of example and without limitation, any mechanism used to control the dispensing of a substance. For example, a seal structure of a solder dispensing assembly prevents solder from leaking outside a target dispensing area.

The term "fusible material" as used herein is intended to be construed broadly so as to encompass, by way of example and without limitation, any substance which may be used to connect a plurality of surfaces together. One example of a fusible material commonly used, for instance, in integrated circuit flip chip technology, is solder.

The term "gas injector" as used herein is intended to be construed broadly so as to encompass, by way of example and without limitation, any mechanism or apparatus that is capable of forcefully dispensing one or more gases.

Figure 1:
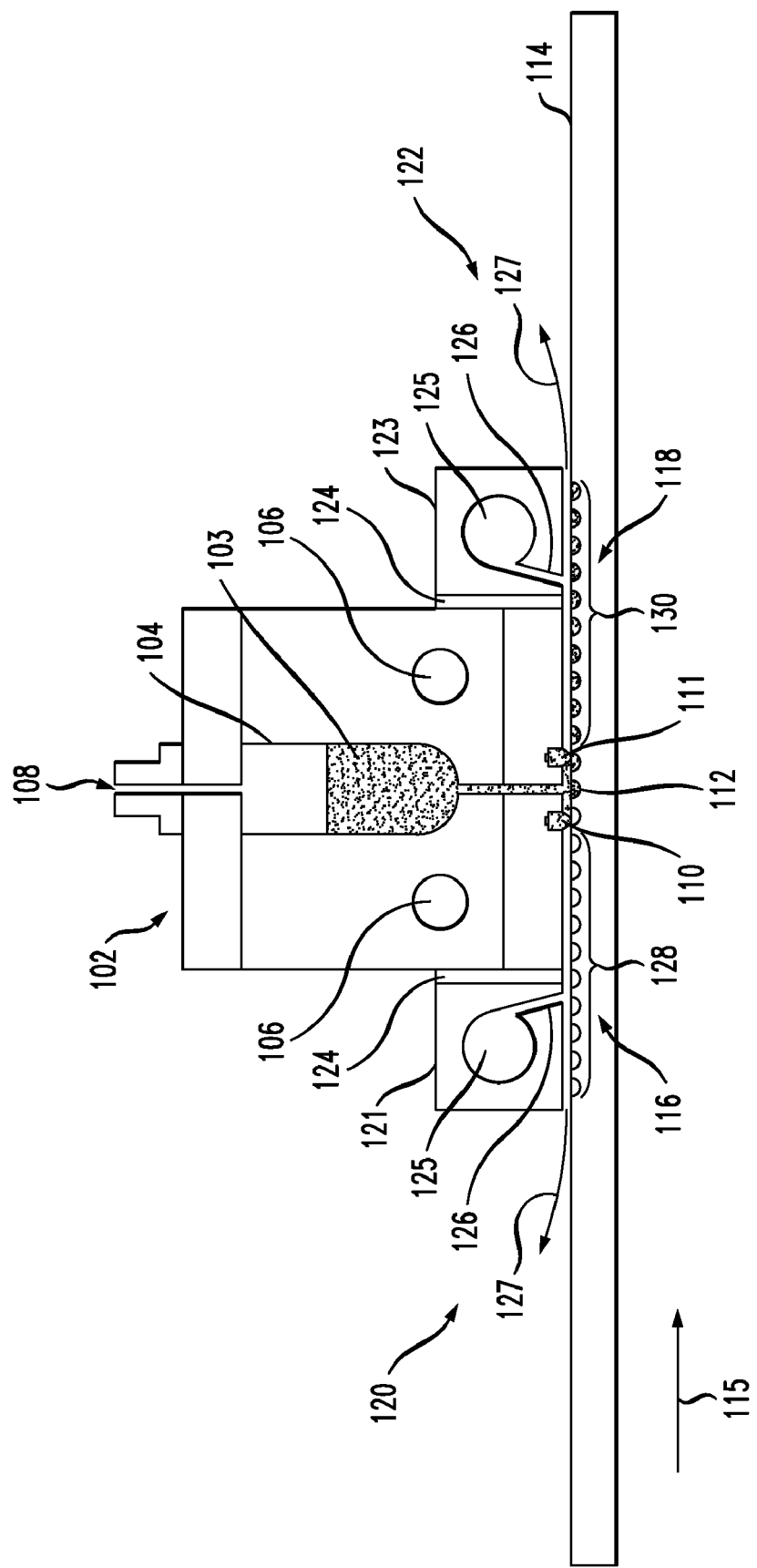
FIG. 1 is an illustrative cross-sectional diagram depicting an exemplary dispensing assembly comprising a leading edge gas injector and a trailing edge gas injector, in accordance with an embodiment of the present invention.

Referring initially to FIG. 1, an illustrative cross-sectional diagram depicts an exemplary dispensing assembly 102 comprising a leading edge gas injector structure 121 and a trailing edge gas injector structure 123, in accordance with an embodiment of the present invention. Dispensing assembly 102, which may comprise, for example, a solder fill head assembly, includes a reservoir 104 containing a molten fusible material 103 (e.g., solder), which is to be dispensed onto a surface. The dispensing assembly 102 may also be equipped with one or more heating units 106 surrounding the reservoir 104 to heat the contained fusible material 103 so as to maintain the fusible material in molten form. To assist in high-speed dispensing of the fusible material 103, a mechanism to pressurize 108 the reservoir 104 may be coupled to the dispensing assembly 102. The dispensing assembly 102 may further comprise a seal structure (e.g., polymer seal), depicted in FIG. 1 as seal portion 110 and seal portion 111 due to the cross-sectioned illustration, at the bottom of the dispensing assembly 102. The seal structure (110 and 111) surrounds a target dispensing area 112 and prevents unintended leakage of the fusible material 103 outside the target dispensing area 112. It is to be appreciated that more than one seal structure may be used to prevent leakage of the dispensed fusible material. In an illustrative embodiment, the seal structure may be formed as an annular ring surrounding an outlet of the reservoir 104.

The fusible material 103 is dispensed in molten form onto a mold plate 114 comprising cavities (e.g., unfilled mold cavities 116 and filled mold cavities 118). This process may proceed as follows. The fusible material 103 contained in the reservoir 104 of the dispensing assembly 102 is heated via the one or more heating units 106 surrounding the reservoir 104. The fusible material 103 is heated above its melting point resulting in a phase change to liquid form (e.g., molten form). For instance, tin solder melts at approximately 230° Celsius, in this case the heating units 106 heat the reservoir 104 to approximately 250° Celsius.

In practice, the dispensing assembly 102 rests on the mold plate 114 and a nominal load or down force is applied (e.g., 2.5 pounds per linear inch of seal may be applied). The contact between the mold plate 114 and the seal structure (110 and 111) of the dispensing assembly 102 prevents the fusible material 103 from leaking uncontrollably out of the bottom of the dispensing assembly 102.

To assist in the dispensing process, the reservoir 104 is preferably pressurized to a pressure between 0 and 20 pounds per square inch (psi). This forces the fusible material 103 to enter the target dispensing area 112 and into the unfilled cavities 116 of the mold plate 114. In an illustrative embodiment, the mold plate 114 is moved laterally (e.g., FIG. 1 illustrates that the mold plate 114 is moving from left to right (115)) underneath the dispensing assembly 102, typically at a speed between 0.1 to 10 millimeters per second relative to the dispensing assembly 102, which remains stationary. Alternatively, the dispensing assembly 102 may be moved while the mold plate 114 remains stationary, or the mold plate and dispensing assembly may both be moved in opposite directions relative to one another. For instance, the dispensing assembly 102 may be operative to move in a direction parallel to a surface (e.g., the mold plate) and/or the dispensing assembly 102 may be operative to move closer to and/or away from a surface (e.g., the mold plate).

After all the cavities of the mold plate 114 are filled with fusible material 103, the plate is removed and passed to another tool, which transfers the molded material to a metalized silicon wafer once the fusible material has cooled to solid form. This second process is known to a person having ordinary skill in the art and will not be discussed herein.

The exemplary dispensing assembly 102 further comprises one or more gas injecting structures (e.g., 121 and 123), or gas manifolds, coupled to the dispensing assembly 102 at a leading edge 120 and a trailing edge 122 of the dispensing assembly 102, respectively. The leading edge 120 defines the relative direction which the dispensing assembly 102 is moving toward and the trailing edge 122 is the relative direction in which the dispensing assembly 102 is moving away from, relative to the mold plate 114. It is to be understood that the assignment of leading and trailing edges is arbitrary. The gas injector structures (121 and 123) function to combat several deficiencies found in conventional solder dispensing mechanisms. First, the polymer seals of a conventional solder dispensing mechanism tend to degrade quickly when they are heated to high temperatures (e.g., +250° Celsius) in the presence of oxygen. Second, after a cavity of a mold plate is filled with solder material, atmospheric air instantly oxidizes the dispensed solder resulting in the creation of an oxidized film over the solder. In some instances, the oxidized film attaches itself to the trailing edge of the solder seal (e.g., seal portion 111). As oxidized material builds up on the seal, it eventually falls off leaving unwanted debris on the mold plate surface. This ultimately results in wafer processing defects.

The lifespan of a seal may be increased and the buildup of oxidized material may be reduced if the fusible material 103 is dispensed in a substantially unreactive environment (e.g., devoid of oxidizing agents). The leading edge gas injector structure 121 and the trailing edge gas injector structure 123 operate to control the gas environment between the seal portion 110 and an outer edge of the leading gas injector structure 121 (e.g., region 128) and between the seal portion 111 and an outer edge of the trailing gas injector structure 123 (e.g., region 130), respectively. By preventing certain gases from coming in contact with the dispensed fusible material, one can substantially reduce or prevent oxidation of the fusible material. As a result, the buildup of oxidized material on the trailing edge of the seal (e.g., seal portion 111) may be significantly reduced and the life of the seal structure (110 and 111) may be extended.

Controlling the gas environments of a dispensing assembly may possess additional benefits. For instance, it should be appreciated that the rate at which a fusible material oxidizes and solidifies affects the grain size, structure, and/or quality of the solidified form of the fusible material. Further, the gas environment in which a fusible material is dispensed may affect adhesion of the fusible material to a surface and the rate at which the fusible material is dispensed.

Figure 2:
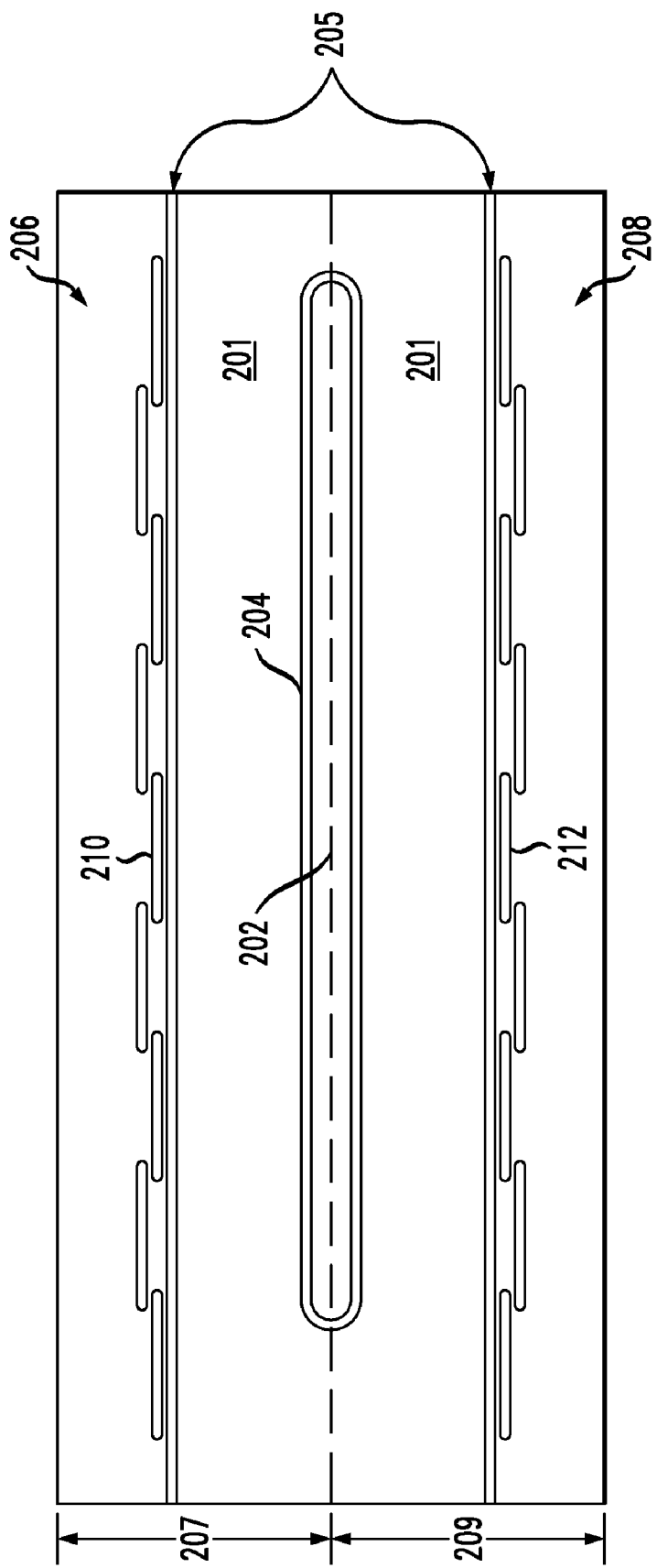
FIG. 2 is an illustrative diagram depicting a bottom view of the exemplary dispensing assembly, in accordance with an embodiment of the present invention.

In an illustrative embodiment, at least one of the one or more gas injector structures (e.g., 121 and 123) comprises a gas reservoir 125 and at least one gas distribution opening 126 (see FIG. 2, 210 and 212 for a bottom view). The one or more gas injector structures, or gas manifolds, may be fabricated from, for example, a metal, a high temperature polymer, and/or a ceramic material. A gas or a gas mixture is introduced into a given gas injector structure (not shown) and stored in the gas reservoir 125 therein. The given gas injector structure may then inject the gas or gas mixture onto the mold plate 114 via the gas distribution opening(s) 126 positioned along the length of the dispensing assembly 102 (see FIG. 2, 210 and 212).

The gas distribution openings 126 allow for an even and uniform distribution of gas beneath the dispensing assembly 102 and across the mold plate surface 114. Further, introducing the gas or gas mixture into the gas reservoir 125 prior to injection provides several advantages. For example, the gas reservoir 125 acts as a collection point, wherein the pressure, temperature, and/or volume of the gas or gas mixture may be regulated. In one embodiment, the gas or gas mixture is pressurized within the gas reservoir 125 allowing, for example, a rapid and consistent expulsion of the gas or gas mixture onto the mold plate surface 114 (e.g., regions 128 and 130). Further, temperature regulation of the gas or gas mixture may occur within the gas reservoir 125, which may ensure a uniform and consistent gas or gas mixture temperature before the gas or gas mixture is injected onto the mold plate 114 (e.g., regions 128 and 130). In addition, the volume of the gas reservoir 125 may be adjusted, for example, to guarantee that a sufficient volume of gas or gas mixture is available to adequately flood the mold plate 114 (e.g., regions 128 and 130) during operation of the dispensing assembly 102.

Preferably, the one or more gas injector structures (e.g., 121 and 123) are thermally isolated from the dispensing assembly 102 so that temperature fluctuations from the one or more gas injector structures do not affect the temperature of the dispensing assembly 102. In one embodiment, at least one insulator 124 is placed between the one or more gas injector structures (e.g., 121 and 123) and the dispensing assembly 102. The insulator 124 may be made of a low thermal conductivity material such as zirconium oxide ceramic.

Furthermore, the one or more gas injector structures (e.g., 121 and 123) may be mounted to the dispensing assembly 102 in such a way that any thermal expansion of the one or more gas injector structures do not influence or mechanically distort the shape of the dispensing assembly 102, for example, by pinning one end of the gas injector structure to the dispensing assembly and attaching the other end to the dispensing assembly via a shoulder screw through a slot.

In an exemplary embodiment, at least one gas is injected beneath the dispensing assembly 102 via the one or more gas injector structures (e.g., 121 and 123). It is to be appreciated that the at least one gas may be a mixture of gases, rather than one pure gas. Further, the at least one gas may comprise water vapor. Water vapor may function to control the rate of adhesion of the fusible material 103 to the mold plate 114.

The injected gas or gases flood the area surrounding the solder seal (e.g., 110 and 111) and between the dispensing assembly 102 and the mold plate 114 (e.g., regions 128 and 130). The injected gas or gases then exit the outer edges of the dispensing assembly 102 (e.g., 127). It should be noted that by controlling the gap between the bottom of the gas injector structures (e.g., 121 and 123) and the mold plate 114, and/or by controlling the gas flow rate, the concentration of gas occupying regions 128 and 130 next to seal portions 110 and 111, respectively, may be controlled. Therefore, each of the one or more gas injector structures (e.g., 121 and 123) may be operative to move closer to and/or away from the mold plate surface.

The gas introduced at the leading edge 120 need not be the same as the gas introduced at the trailing edge 122. Preferably, a different gas or gas mixture is introduced at the leading edge 120 (e.g., region 128) of the dispensing assembly 102 as compared to the trailing edge 122 (e.g., region 130). As stated above, a polymer seal degrades more rapidly at elevated temperatures in the presence of oxygen. Further, a fusible material is ideally dispensed onto a surface without any oxidation. Therefore, the gas or gas mixture injected at the leading edge 120 of the dispensing assembly 102 may be inert and oxygen free. For example, 100% nitrogen, argon, helium, etc., may be employed. It may also be advantageous to consider a lighter than air gas at the leading edge 120 of the dispensing assembly 102, because such a gas, for example helium, is easier to expel from the mold plate cavities as fusible material is dispensed, leading to an increased dispensing speed.

As for the trailing edge 122 (e.g., region 130), some oxidation may be preferred to encourage some solidification of the fusible material; therefore, the trailing edge gas mixture may contain an inert gas with a small percentage of oxygen mixed in. For instance, in order to form a thin oxidized layer on top of the dispensed fusible material, a 94% nitrogen and 6% oxygen gas mixture may be sufficient. In contrast, air contains 78% nitrogen, 21% oxygen, and ~1% argon, which causes too much oxidation. Therefore, by injecting the trailing edge of the dispensing assembly with an oxygen-reduced mixture, oxide buildup on the seal of the dispensing assembly (e.g., seal portion 111) is significantly reduced as compared to an air environment, but a controlled amount of oxidation will still occur.

To accommodate varying manufacturing circumstances, the gas or gases injected at the leading edge 120 and the trailing edge 122 of the dispensing assembly 102 may be adjusted according to the operation state of the dispensing assembly. For example, when the dispensing assembly is idle (e.g., not performing a dispensing operation), the at least one gas may be switched to 100% nitrogen to minimize oxidation of standing fusible material. Additionally, depending on a manufacturer's preferences, the at least one gas may be heated or cooled to promote a faster filling operation or solidification of the fusible material, respectively. For example, to prevent rapid cooling of the fusible material, it may be advantageous to heat the at least one gas injected at the leading edge 120 (e.g., region 128) of the dispensing assembly 102 to warm the mold plate 114 prior to dispensing. In the alternative, the at least one gas may be cooled, thereby cooling the mold plate 114 and encouraging rapid solidification of the fusible material; this technique may be applied to the trailing edge 122 (e.g., region 130) to quickly cool the filled cavities in the mold plate 114. Furthermore, the specific composition of the trailing edge gas mixture may be adjusted to influence the grain size and/or structure of the fusible material as it solidifies.

Referring now to FIG. 2, an illustrative diagram depicts a bottom view of the exemplary dispensing assembly 102 of FIG. 1, in accordance with an embodiment of the present invention. The center portion of the dispensing assembly 201 comprises an opening 202 from which fusible material 103 is dispensed; the fusible material 103 pours directly from the reservoir 104 of FIG. 1. The center portion of the dispensing assembly 201 further comprises a circular seal 204 (e.g., polymer seal) surrounding the opening 202, which is equivalent to the seal structure 110 and 111 of FIG. 1. It is to be understood that the shape and size of seal 204 is not limited to that shown. Moreover, seal 204 may be formed as a plurality of separate seal structures.

A leading edge gas injector structure 206 (e.g., leading gas manifold) and a trailing edge gas injector structure 208 (e.g., trailing gas manifold) are coupled to the center portion of the dispensing assembly 201. The center portion of the dispensing assembly 201 is separated from gas injector structures 206 and 208 by insulating material 205. The leading edge gas injector structure 206 comprises at least one gas distribution opening 210 where a first gas or gas mixture is distributed to control the gas environment of the space between a leading portion of the seal 204 and an outer edge of the leading edge gas injector structure 206 (e.g., region 207). The trailing edge gas injector structure 208 comprises at least one gas distribution opening 212 where a second gas or gas mixture is distributed to control the gas environment of the space between a trailing portion of the seal 204 and an outer edge of the trailing edge gas injector structure 208 (e.g., region 209). The gas injector structures (206 and 208) and the gas distribution openings (210 and 212) are not limited to any particular number, size, and/or shape.

Although illustrative embodiments of the present invention have been described herein with reference to the accompanying figures, it is to be understood that the invention is not limited to those precise embodiments, and that various other changes and modifications may be made therein by one skilled in the art without departing from the scope of the claims.

What is claimed is:

1. An apparatus for dispensing fusible material onto a surface, wherein the fusible material is in molten form, the apparatus comprising:
  a dispensing assembly comprising a seal structure, wherein the seal structure controls dispensing of the fusible material; and
  at least two gas injectors coupled to the dispensing assembly, each of the at least two gas injectors adapted to inject at least one different gas to the dispensing assembly for controlling a gas environment surrounding different portions of the seal structure, wherein an oxidation rate of the fusible material is controlled as a function of at least one characteristic of at least one of the different gases.

2. The apparatus of claim 1, wherein the dispensing assembly further comprises a reservoir for containing the fusible material.

3. The apparatus of claim 2, wherein the reservoir is pressurized.

4. The apparatus of claim 2, wherein the dispensing assembly further comprises a heating unit surrounding the reservoir for heating the fusible material.

5. The apparatus of claim 1, wherein the dispensing assembly is operative to at least one of move in a direction parallel to the surface, move closer to the surface, and move away from the surface.

6. The apparatus of claim 1, wherein at least one of the at least two gas injectors comprises a gas manifold.

7. The apparatus of claim 6, wherein the gas manifold is fabricated from at least one of a metal, a high temperature polymer, and a ceramic material.

8. The apparatus of claim 1, wherein at least one of the at least two gas injectors is operative to move closer to and away from the surface.

9. The apparatus of claim 1, wherein at least one insulator is placed between the at least two gas injectors and the dispensing assembly.

10. The apparatus of claim 1, wherein at least one of the at least two gas injectors comprises at least one gas distribution opening for providing even gas distribution.

11. The apparatus of claim 1, wherein at least one of the at least two gas injectors comprises a gas reservoir adapted to hold at least one of the different gases.

12. The apparatus of claim 1, wherein at least one of the at least two gas injectors is operative to inject at least one of the different gases at a constant pressure.

13. The apparatus of claim 1, wherein at least one of the at least two gas injectors is positioned at a leading edge of the dispensing assembly and wherein at least another one of the at least two gas injectors is positioned at a trailing edge of the dispensing assembly.

14. The apparatus of claim 1, wherein the apparatus controls at least one of a dispensing rate of the fusible material and an adhesion of the fusible material to the surface as a function of the at least one characteristic of at least one of the different gases.

15. The apparatus of claim 1, wherein the apparatus controls at least one of a grain size and a structure of a solidified form of the fusible material as a function of the at least one characteristic of at least one of the different gases.

16. The apparatus of claim 1, wherein at least one of the different gases comprises at least one of nitrogen, argon, helium, and oxygen.

17. The apparatus of claim 1, wherein at least one of the different gases comprises water vapor, wherein an adhesion of the fusible material is controlled as a function of at least one characteristic of the water vapor.

18. The apparatus of claim 1, wherein at least one of the at least two gas injectors is operative to control a temperature of at least one of the different gases.

19. A method for dispensing fusible material onto a surface, wherein the fusible material is in molten form, the method comprising the step of:
  injecting at least two different gases via at least two gas injectors to a dispensing assembly to control a gas environment surrounding at least a portion of a seal structure of the dispensing assembly, wherein the dispensing assembly dispenses the fusible material, further wherein an oxidation rate of the fusible material is controlled as a function of at least one characteristic of at least one of the at least two different gases.

20. The method of claim 19, wherein the step of injecting further comprises the step of evenly distributing the at least two different gases using a gas distribution opening of the at least two gas injectors.

21. The method of claim 20, further comprising the step of storing the at least two different gases in a gas reservoir of the at least two gas injectors.

22. The method of claim 20, wherein the at least two different gases are injected at a constant pressure.

23. The method of claim 20, further comprising the step of injecting at least one of the at least two different gases via a given one of the at least two gas injectors from of a leading edge of the dispensing assembly and injecting at least another one of the at least two different gases via another given one of the at least two gas injectors from a trailing edge of the dispensing assembly.

24. An apparatus for dispensing fusible material onto a surface, wherein the fusible material is in molten form, the apparatus comprising:

a dispensing assembly with a leading edge and a trailing edge, comprising: (i) a reservoir for containing the fusible material; (ii) a pressure system coupled to the reservoir for pressurizing the reservoir; (iii) a heating unit surrounding the reservoir for heating the fusible material; and (iv) a seal structure coupled to the reservoir for controlling a dispensing of the fusible material; a first gas injector comprising a gas reservoir and at least one gas distribution opening, wherein the first gas injector is operative to inject a first at least one gas to the dispensing assembly and is positioned at the leading edge of the dispensing assembly; and a second gas injector comprising a gas reservoir and at least one gas distribution opening, wherein the second gas injector is operative to inject a second at least one gas to the dispensing assembly and is positioned at the trailing edge of the dispensing assembly, wherein at least one insulator is positioned between the dispensing assembly and at least one of the first and second gas injectors.

* * * * *